United States Patent [19]
Symonds

[11] 3,786,945
[45] Jan. 22, 1974

[54] SPOUT CONTROL SYSTEM
[75] Inventor: Dean Homer Symonds, Davenport, Iowa
[73] Assignee: Deere & Company, Moline, Ill.
[22] Filed: Jan. 15, 1973
[21] Appl. No.: 323,984

[52] U.S. Cl............................................. 214/42 A
[51] Int. Cl........................................... B65g 67/22
[58] Field of Search........................ 214/42 R, 42 A

[56] References Cited
UNITED STATES PATENTS
2,905,843   9/1959   Heising........................... 214/42 A
3,289,864   12/1966   Hochmuth........................ 214/42 A Primary Examiner—Robert G. Sheridan

[57] ABSTRACT

The lateral swing of a discharge spout on a forage harvester is magnetically governed such that the spout is kept in proper coordination with the crop inlet port of a trailing wagon as the harvester is negotiated through turns. A wire loop encircling the wagon, upon excitation by an AC signal, produces a magnetic field which is sensed by a signal coil mounted on the discharge spout and adapted for common movement therewith. The signal coil has an output voltage, the amplitude of which varies as the wagon swings relative to the spout. This output voltage is compared with the loop excitation signal to denote any phase differential and the resulting voltage signal, after being passed through a dead band generator, drives a bi-directional electrohydraulic unit which swivelly swings the discharge spout into proper coordination with the crop inlet of the wagon.

9 Claims, 7 Drawing Figures

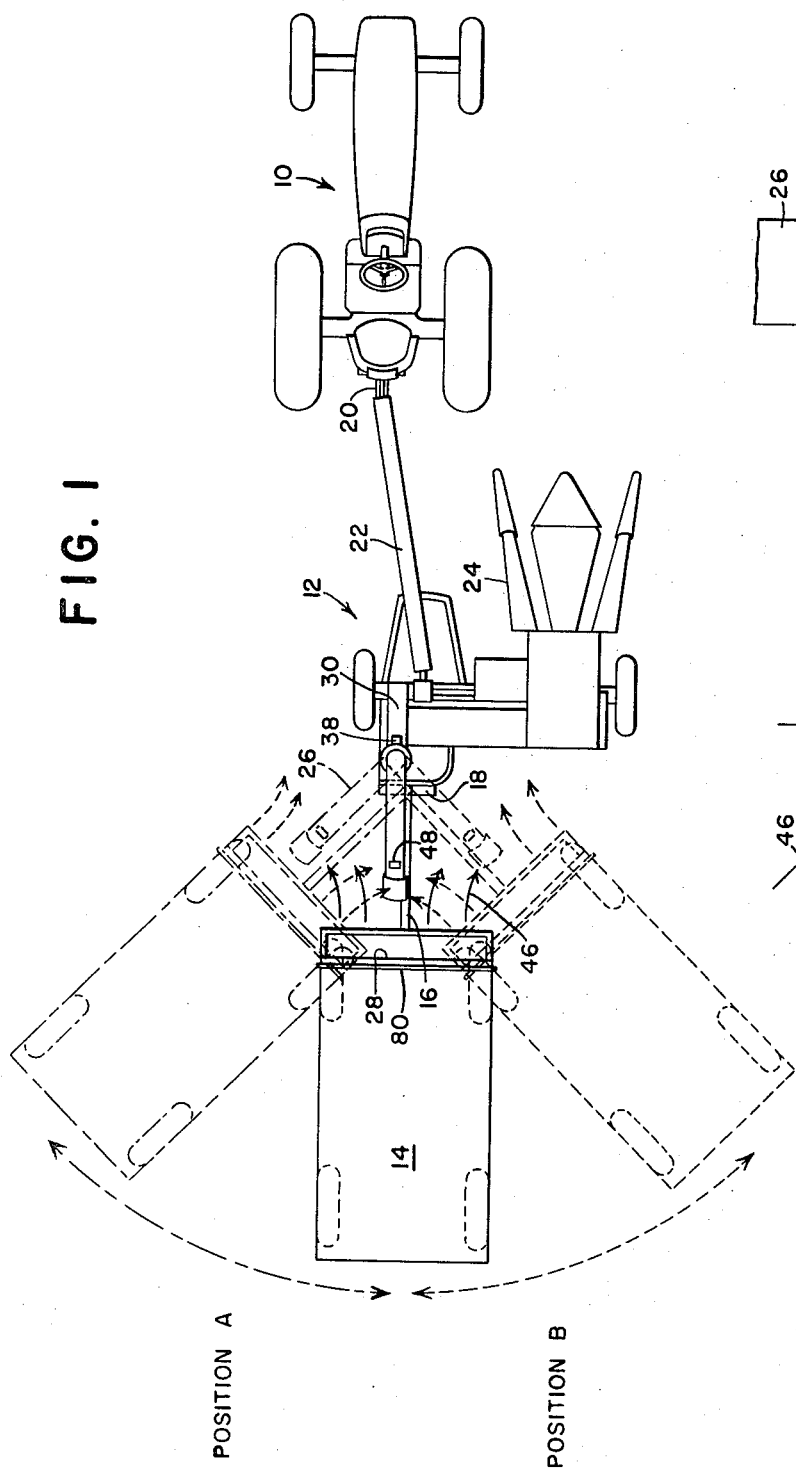
FIG. 1
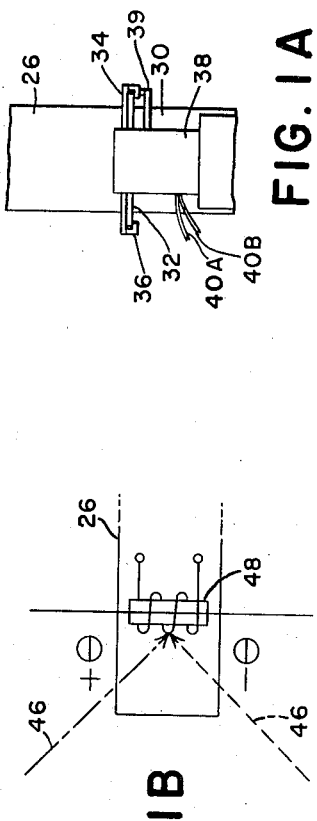
FIG. 1A
FIG. 1B 3,786,945

SPOUT CONTROL SYSTEM

BACKGROUND OF THE INVENTION

This invention relates to agricultural harvesting equipment and more particularly to a control system for magnetically regulating the lateral movement of a discharge spout on a forage harvester.

Oftentimes it is desirable to synchronize the lateral swinging of a discharge spout on a travelable harvester such as in gathering forages. This type of harvester is either self-propelled having a trailing wagon, or constitutes the middle implement in a three-vehicular agricultural train wherein a tractor pulls the harvester and a wagon trails behind the harvester. The wagon has a crop inlet port into which a spout on the harvester discharges the harvested forage. As the harvester is negotiated around the corners of a field, it is necessary to laterally swing the discharge spout relative to the harvester so that the forage continues to be discharged into the wagon rather than being thrown onto the ground beside the wagon. After the turn has been negotiated, and the implements in the vehicular train return to an in-line relationship, the spout must be swung in reverse to maintain proper dischargement of the harvested forage.

A presently used method of swivelly moving the discharge spout is to provide the harvester with a worm and worm wheel arrangement with an elongated crank arm extending the length of the harvester to within the reach of the operator seated on the tractor. In negotiating a corner of a field, the operator turns the crank to rotate the worm in the proper direction which in turn laterally swings the spout.

A second presently used method of swivelly moving the spout is to provide a bi-directional electrohydraulic unit to turn the spout with the control switch for the unit located on the tractor adjacent the operator. During cornering, the operator actuates the control switch to operate the unit and turn the spout in one direction and, after the corner has been negotiated, actuates the switch to operate the unit and turn the spout in the opposite direction to return the spout to the original position.

A principal disadvantage of these presently used methods of moving the spout is the fact that the operator must look back and observe the spout to assure proper positioning while the tractor is moving forward, thus presenting an obvious safety hazard. Also, the manual manipulation required distracts the operator from the driving of the tractor. In addition, the operator may forget to turn the spout at times and, consequently, forage will be spilled on the ground.

U.S. Pat. No. 2,905,343, issued to Heising on 22 Sept. 1959, discloses mechanical means for automatically swinging the discharge spout in response to lateral movement of the wagon.

SUMMARY OF THE INVENTION

It is therefore an object of this invention to present an improved automatic spout control device for governing the lateral movement of the discharge spout on a forage harvester.

It is still a further object of this invention to present a magnetically operated control system for governing the lateral swinging of a discharge spout in response to lateral movement of the crop inlet port on a trailing wagon.

The magnetic control circuit for accomplishing the above stated objects incorporates a loop of wire wrapped around a wagon which is energized with an alternating current to produce a magnetic field. The angular movement of a signal coil mounted on the discharge spout relative to the wire loop causes a voltage to be induced in the coil with a magnitude proportional to the cosine of the angle between the coil axis and the magnetic flux vector. The phase of the voltage changes with respect to the loop current as the coil is rotated through a null position which represents the in-line relationship between the spout and the wagon crop inlet port. The signal from the antenna is detected by a synchronous phase detector which produces an output voltage having a magnitude proportional to the cosine of the angle between the coil axis and the magnetic flux vector and having an algebraic sign determined by the phase. This output voltage is amplified and operated on by a variable gain circuit to obtain an amount of dead band. Further power amplification is used for driving an electrohydraulic unit which positions the discharge spout of the harvester. The system is phased to cause the signal coil to drive to the null position where the output signal ceases and the electrohydraulic unit is turned off.

BRIEF DESCRIPTION OF THE DRAWINGS

Other objects and advantages of the invention will become apparent upon reading the following detailed description and upon reference to the drawings, in which:

FIG. 1 is a top plan view of an agricultural harvesting vehicular train showing the cooperation between a swivelly mounted discharge spout of a harvester and a trailing wagon in collecting the harvested crop, the positions of the wagon relative to the harvester during cornering being shown in dotted lines.

FIG. 1A is a cutaway view of the base of the discharge spout showing the swivelable mounting of the spout onto the harvester and also the electrohydraulic unit used for swingingly driving the spout.

FIG. 1B shows the angle $\theta$, the angle between the axis of the signal coil and the magnetic flux vector.

FIG. 3A shows the relative positioning of the signal and reference coils, elements of the invention.

DESCRIPTION OF THE PREFERRED EMBODIMENT

Figure 2:
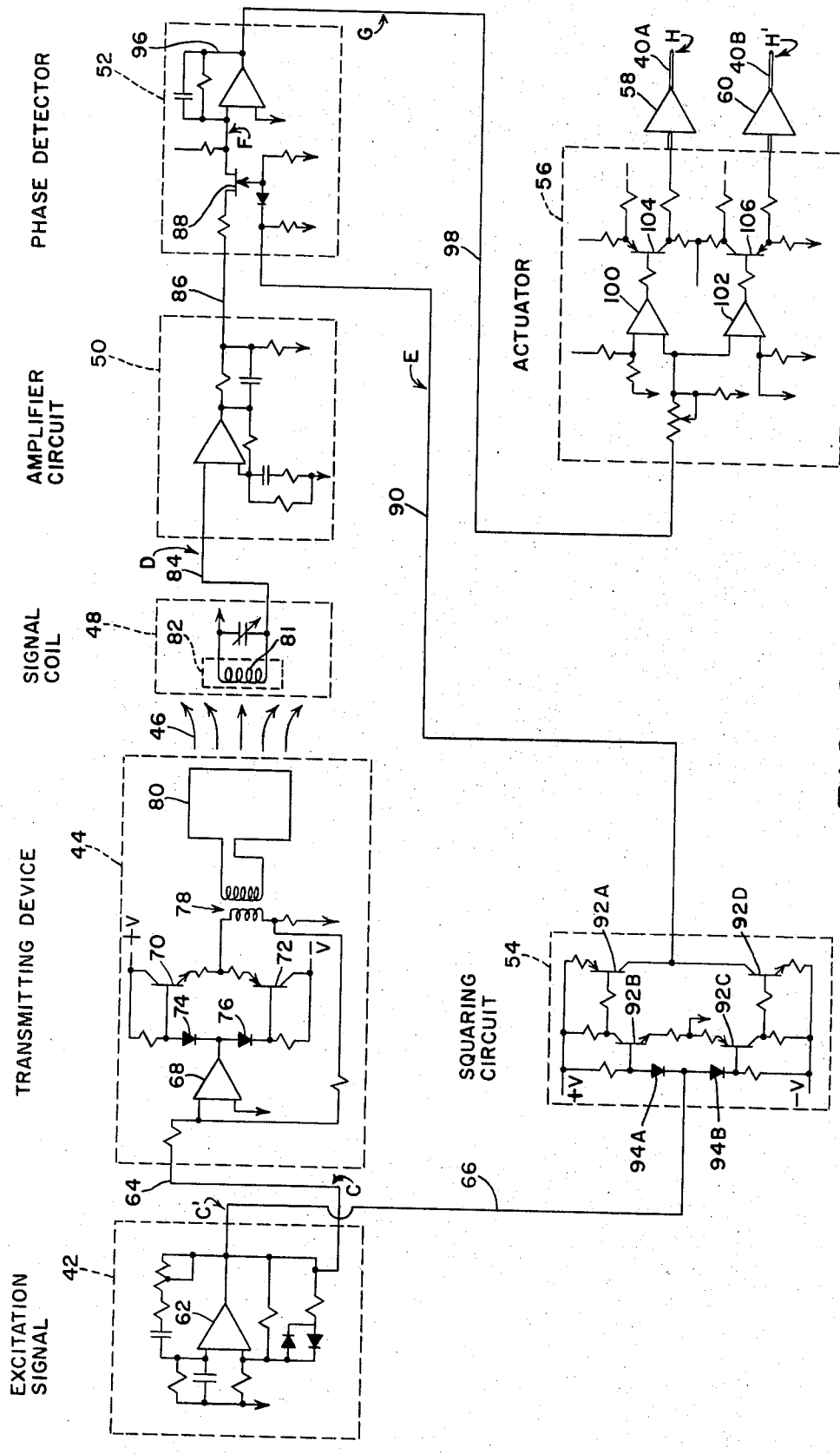
FIG. 2 is a block diagram of one embodiment of the magnetic spout control system of this invention.

While the invention will be described in connection with specific embodiments, it will be understood that it is not intended to limit the invention to those embodiments. On the contrary, it is intended to cover all alternatives, modifications and equivalents as may be included within the spirit and scope of the invention as defined by the appended claims.

Looking now at FIG. 1, a conventional tractor 10 provides the motivating force for a forage harvester 12, which discharges the harvested crop into a trailing wagon 14 having a conventional tongue 16. The harvester 12 is connected to a conventional drawbar of the tractor 10, and the tongue 16 of the wagon 14 is connected to a hitch 18 on the rear of the harvester 12. A PTO unit 20 of the tractor powers the cutting, auger and blower mechanisms of the harvester through a drive shaft 22.

In operation, the tractor pulls the vehicular train through the field along the rows of crop to be harvested and around the corners of the field. A harvesting attachment 24 on the harvester 12 feeds the crop into the harvester, where it is chopped and fed to a blower 30 which blows the ensilage upwardly and rearwardly through a discharge spout 26 into the bed of the wagon through a wagon crop inlet port 28. As the wagon is negotiated around a turn, it swings laterally relative to the spout normally within a range of ± 45°, as indicated by the dashed lines in FIG. 1.

As can be readily appreciated by viewing FIG. 1, if the discharge spout were rigidly secured to the harvester rather than being laterally movable, as the tractor pulled the harvester around a corner of the field the harvested forage would miss the wagon and be blown onto the ground, since the harvester would negotiate the corner before the wagon. In order to overcome this difficulty, the discharge spout is swivelly mounted to the harvester such that the spout can be swung laterally during turning to keep the discharge spout in line with the crop inlet port of the wagon.

FIG. 1A depicts one of several ways of swivelly connecting the discharge spout to the outlet of the blower 30. The outlet of the blower 30 ends in a circular flange member 32 extending around the perimeter of the outer wall thereof. The lower end of discharge spout 26 carries a second flange member 34 having an outer diameter slightly larger than the outer diameter of the flange member 32. An L-shaped lip 36 depends downwardly from the flange member 34 to encircle the flange 32, thereby swivelly securing the discharge spout 26 to the blower 30. An electrohydraulic bi-directional drive unit 38 governs the swivelling of spout 26. The electrohydraulic control unit is conventionally constructed and includes an electrical motor powering a hydraulic pump which operably supplies fluid to a cylinder for reciprocating a piston 39 connected to the discharge spout.

As previously mentioned, this invention comprises a novel electrical control system using magnetic principles for initiating the command signals sent to the electrohydraulic drive unit 38 for governing the bi-directional lateral swinging movement of the discharge spout 26 to assure proper positioning of the spout so that forage is continually discharged into the inlet port of the wagon 14.

Turning now to FIG. 2 of the drawings, the specific components of one embodiment of the magnetic control system of this invention are shown schematically. Generally, the control circuit of this invention includes an excitation signal source 42 which furnishes a high frequency AC signal to a magnetic transmitting device 44. The transmitting device is mounted on the wagon 14 and produces a magnetic field emanating from the wagon generally in the direction of the travel of the wagon as is denoted by the arrows 46. The magnetic field created by the magnetic transmitting device on the wagon induces a voltage in a signal coil 48 carried by the discharge spout 26 of the harvester. The voltage induced in the signal coil has a magnitude proportional to the cosine of the angle $\theta$, the angle between the axis of the coil and the magnetic flux vector at the coil as is shown in FIG. 1B. The voltage induced in the signal coil is amplified by an amplifier circuit 50 and is then passed into a phase detector 52. Within the phase detector the induced voltage is multiplied with a square wave voltage produced by a squaring circuit 54. The multiplication of the voltage induced in the signal coil and the squaring circuit electrically determines the phase of the induced voltage. The resulting voltage signal is then fed into an actuator 56 having a variable gain circuit to produce an amount of dead band before the signal is power amplified by appropriate amplifiers 58 and 60 to drive the electrohydraulic drive unit 38 in the appropriate direction to properly coordinate the spout with the inlet port of the wagon.

The excitation signal source 42 includes an electrical oscillator having an amplifier 62 which produces an alternating current output signal on two leads 64 and 66. While the invention is not limited to any specific frequency, it has been found that an opportune frequency to obtain desired results is 8-10 kilohertz.

The electric oscillator, as well as the remaining circuitry hereinafter discussed, receive power from a conventional power source (not shown) in the normal manner.

Since the feeding of power to the circuitry is well known to those skilled in the art, specific reference to each connection will not be made hereinafter.

The lead 64 carries the alternating current signal to the magnetic transmitting device 44 where the signal is fed to a second amplifier 68 which biases the base of two transistors 70 and 72 through diodes 74 and 76. The emitters of both transistors 70 and 72 are connected to the primary side of a transformer 78 typically having a turn ratio of 10 to 1. A loop of wire 80 consisting of at least one turn encircling the sides, top and bottom of the wagon 14 is connected acrpss the secondary winding of the transformer 78. It is to be noted that due to well-known magnetic principles, loop of wire 80, upon excitation by the 8 kilohertz alternating current generated by the excitation signal source 42, produces a magnetic field having a flux vector 46 S'.

The magnetic field created by the excitation current in the wire loop 80 induces a voltage, hereinafter referred to as the signal voltage, in the signal coil 48 mounted on the spout and adapted for common movement therewith. The signal coil 48 includes a coil of wire 81 wrapped around a magnetic core 82. The axis of the magnetic core 82 is physically arranged such that the induced voltage in the coil will have a magnitude proportional to cosine $\theta$, where, as before mentioned, $\theta$ is the angle between the axis of the core and the magnetic flux vector at the coil. Consequently, the induced voltage has zero magnitude when the discharge spout is in proper coordination with the wagon, a condition which will hereinafter be referred to as the null position. Also, the phase of the induced voltage changes with respect to the excitational signal current by approximately 180° as the signal coil 48 is rotated through the null position.

The induced voltage in the signal coil is passed over a lead 84 through the conventional amplifier circuit 50 and then fed into one input of the phase detector 52 over lead 86. The phase detector 52 multiplies the amplified signal voltage with a signal representative of the excitation signal originating from excitation signal source 42 to determine the phase of the induced voltage. As before mentioned, the phase of the signal voltage with respect to the excitation signal depends on which side of null position the spout is relative to the wagon. Hence, the phase can be electrically utilized to determine which direction to drive the spout to bring it into the null position. Multiplication is internally accomplished by means of a switching transistor 88 having its input coupled to the lead 86 and gated by a square wave indicative of the phase of the excitation signal emanating from the squaring circuit 54 over a lead 90.

The squaring circuit 54 receives the original 8 kilohertz excitation current signal from the excitation signal source 42 over the lead 66, and the square wave output thereof has a phase indicative of the original phase of the excitation current. Internally, the squaring circuit 54 incorporates conventional transistors 92A, 92B, 92C and 92D, and diodes 94A and 94B electrically coupled in the normal manner familiar to those skilled in the art.

Referring attention again to the phase detector 52, the multiplied signal voltage is passed from the switching transistor 88 through a filtering and amplification network 96 to obtain a linear voltage signal output, which is cognizant of both the magnitude and phase of the signal voltage.

This linear output signal from the phase detector 52 is fed into the actuator 56 over a lead 98. The actuator 56 contains a variable gain circuit of parallel amplifiers 100 and 102 feeding the transistors 104 and 106 to obtain an amount of dead band. By dead band it is meant that the system is insensitive to changes in induced voltage within a limited range. This dead band is introduced in order to create a stable system and to prevent fluttering or oscillating of the discharge spout when the harvester and wagon are in line and are traveling through straight stretches in the field. Depending upon the direction in which the spout is to be swively rotated, the actuator 56 will energize either power amplifier 58 or 60 which will then control the driving of the electrohydraulic drive unit 38 through either lead 40A or 40B to position the spout in a normal manner. Once the spout has been driven into proper coordination with the inlet port of the wagon, the induced voltage in the signal coil 48 as before mentioned goes to zero and the electrohydraulic unit 38 is turned off.

Figure 4:
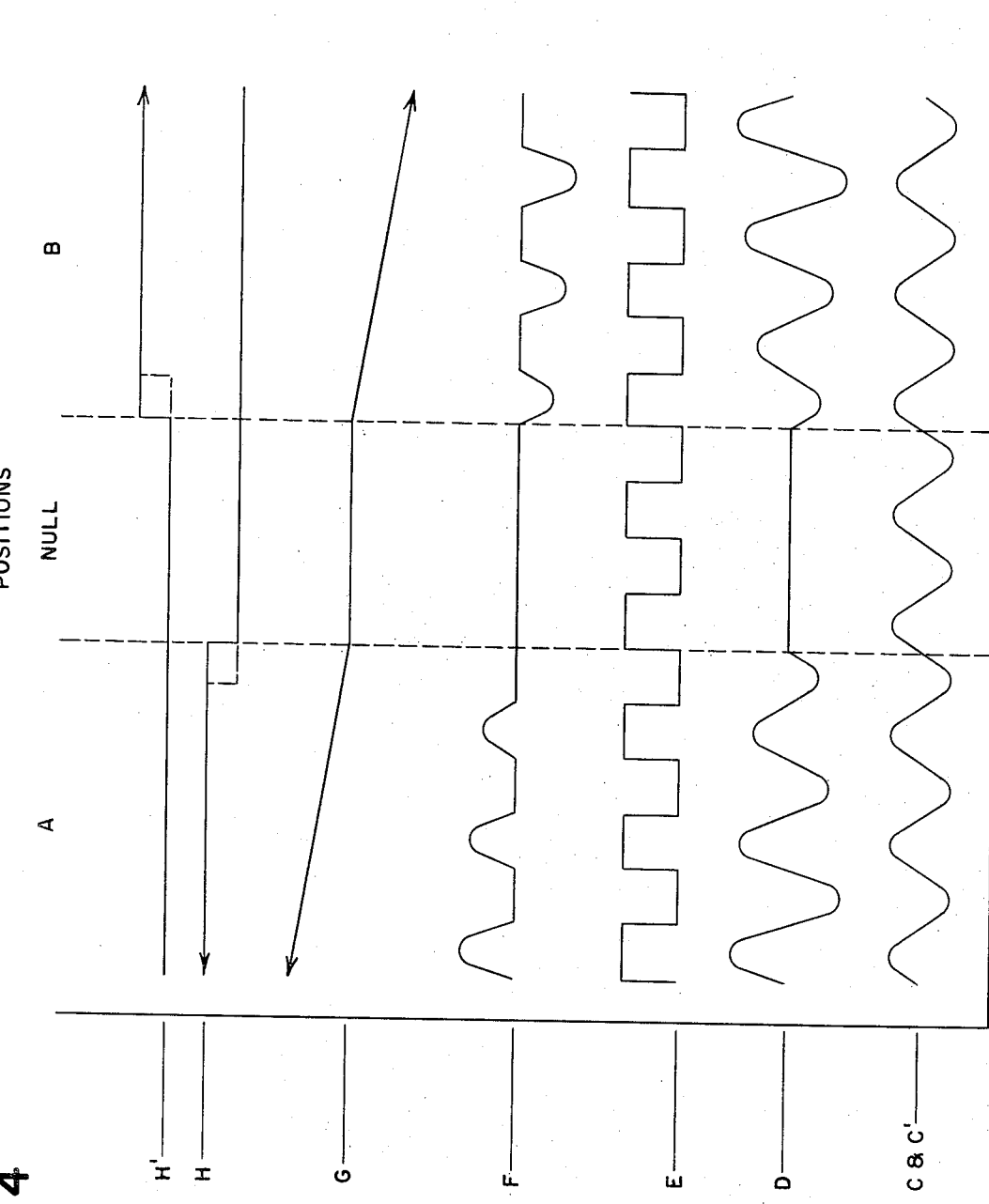
FIG. 4 is a graphical representation of the various voltage signals taken at various points in the control circuit of this invention.

The operation of the control system of this invention can best be understood by reference to the voltage wave forms taken at various points in the circuit and shown graphically in FIG. 4. The graph in FIG. 4 is divided into three segments which represent three positions of the wagon relative to the discharge spout. the null position represents the proper coordination of the spout with the inlet of the wagon; that is when the spout is properly discharging the ensilage into the wagon. In position A, the wagon is swung to the right of the spout, and in position B the wagon is swung to the left of the spout. The locations of the various voltage detection points as shown in FIG. 2 are as follows:

Point C and C' - the output of the excitational signal source 42.
Point D - the output of the signal coil 48.
Point E - the output of the squaring circuit 54.
Point F - the signal between switching transistor 88 and the filter network 96 of the phase detector.
Point G - the output of the phase detector 52.
Point H and H' - the outputs of valve actuator 56.

Looking now at Points C and C', the excitation signal current from the excitation signal source 42 is a sine wave of a substantially constant amplitude during the full swing of relative movement between the wagon and the discharge spout. Thus, the sine wave has a substantially constant magnitude in position A, the null position and position B.

At point D as the wagon travels through position A, the induced voltage has the same phase as the excitation signal source, but the voltage amplitude varies as the angle $\theta$ changes. As the spout nears alignment with the wagon, the amplitude of the induced voltage decreases until at null position, it becomes zero. As the wagon is swung to the right through position B, voltage is again induced in signal coil 42, however, the voltage is now 180° out of phase with the excitation signal current. As in position A, the amplitude of the induced voltage varies as the angle $\theta$ changes.

The square wave generated at point E by the squaring circuit 54 has a constant amplitude and phase irregardless of the relative position of the wagon and spout.

At point F, as the wagon is swung through position A, the multiplied voltage output of transistor 88 is in phase with the excitation signal current and has the negative chopped off. As the wagon and spout travel through the null position, the voltage goes to zero. When the wagon swings through position B, the positive half cycles of the voltage are chopped off and the negative half cycles form the output since the induced voltage has shifted 180° in phase with respect to the excitation signal.

At point G, during travel of the wagon from the outer limits of position A to the null position, the induced voltage is a function decreasing in value until it reaches zero at the null position. As the wagon swings from the null position to the outer limits of position B, the induced voltage is a function having a value of zero at the null position and increasingly becoming more negative as the angle $\theta$ becomes less.

When the wagon moves from the null position into position A beyond the dead band generated by actuator 56, a voltage appears at point H to actuate the electrically controlled valve in the bi-directional electrohydraulic unit 38 to cause the unit to drive the discharge spout into proper coordination with the wagon. Upon the attainment of the null position, the voltage at point H drops to zero and remains zero throughout travel of the wagon through position B. It is well to note here that due to the dead band generated by the actuator 56, a voltage will not appear at H until after the wagon has swung a sufficient number of degrees through position A to exceed the dead band, as is noted by the dot-dashes in FIG. 4.

Turning now to point H', while the wagon travels through either position A or the null position, no voltage appears at this terminal. Likewise, there will not be any voltage at this point as the wagon begins to move through position B so long as the dead band, noted by dot-dashes in FIG. 4, is not exceeded. However, when the wagon has laterally moved through a sufficient angle in position B to overcome the dead band, a voltage appears at point H' which actuates electrohydraulic unit 38 to cause the unit to drive the spout into proper coordination with the wagon inlet. Upon attainment of the null position, the voltage at H' drops to zero and remains at zero until the dead band is again exceeded.

Figure 3:
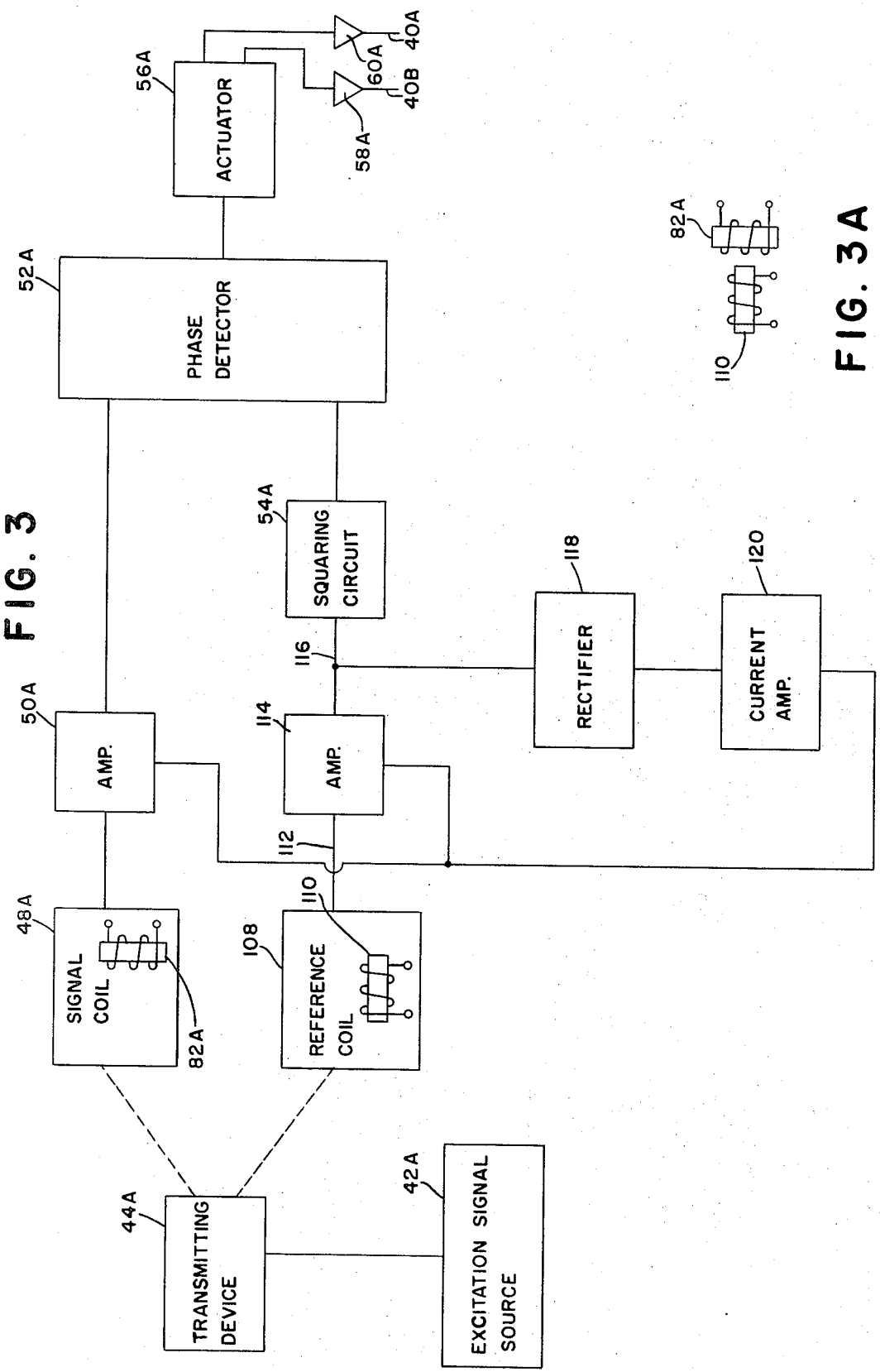
FIG. 3 is a block diagram of the electrical circuit of a second embodiment of the magnetic spout control system of this invention.

Looking now at FIG. 3, there is shown a second embodiment of the magnetic spout control circuitry of this invention. In this embodiment, the lead 66 of the first embodiment has been replaced by a reference coil 108, thereby eliminating the need for a lead 66.

An excitation signal source 42A excites a magnetic transmitting device 44A. The excitation signal source 42A and the transmitting device 44A perform the same functions as the excitation signal source 42 and the transmitting device 44 shown in the first embodiment, and reference is made to this embodiment for an understanding of the internal electronics thereof. The transmitting device 44A, similar to the transmitting device 48 of the first embodiment, includes a loop of wire encircling the sides, top and bottom of the wagon and generates a magnetic field.

A signal coil 48A is mounted on discharge spout 26 of harvester 12 for common movement therewith and includes a magnetic core 82A having its longitudinal axis perpendicular to the magnetic flux vector when the wagon and the discharge spout are in the null position. Thus, the voltage signal induced in signal coil 48A will be proportional to cosine $\theta$.

The voltage induced in signal coil 48A is fed through an amplifier 50A into a phase detector 52A wherein the induced voltage is multiplied to electronically note any phase shift between the voltage induced in signal coil 48A and a reference signal from circuit 54A.

In this embodiment the input to squaring circuit 54A, rather than being received over a lead 66 from the oscillator located in the excitation signal source, as in the first embodiment, is received from the output of a reference coil 108 mounted on the discharge spout and having a voltage induced therein by the magnetic field emanating from the transmitting device 44A. Reference coil 108 includes a magnetic core 110, the axis of which is perpendicular to the axis of core 82A of the signal coil 48 and in the null position, parallel to the magnetic flux vector at coil 108. Hence the voltage induced in reference coil 108 is proportional to sine $\theta$ rather than cosine $\theta$. Since mathematically sine $\theta$ does not change phase as the coils 48A and 108 pass through the null position, any voltage induced in the reference coil 108 will not significantly change phase with respect to the excitation signal. Consequently, such voltage can be used in place of the voltage received over lead 66 from the excitation source.

For the sake of explanation, the reference coil 108 is shown schematically in FIG. 3 as being spaced from the signal coil 48A. However, the actual physical mounting of the two coils on the discharge spout 26 as depicted in FIG. 3A shows the reference coil 108 placed at a right angle and adjacent to the midpoint of signal coil 48A.

The voltage induced in the reference coil 108 is passed through a lead 112 into an amplifier 114. After amplification, the induced voltage is fed over lead 116 to squaring circuit 54A which generates a square wave for gating a switching transistor in phase detector 52A in the same manner as squaring circuit 54 gated transistor 88 of phase detector 52 in the first embodiment.

The output of the phase detector 52A is fed into the actuator 56A which is identical in operation to the actuator 56, and reference is hereby made to the actuator 56 for an understanding of the internal components and workings of the valve actuator 56A. Depending upon which direction the spout needs to be swung to become properly coordinated with the wagon, the actuator 56A energizes one or the other of two power amplifiers 58A or 60A, which drives the electrohydraulic drive unit 38 in the same manner as previously discussed. The electrohydraulic unit 38 positions the forage harvester spout in appropriate direction to properly coordinate the spout 26 with the wagon inlet port 28.

Paralleled into the circuit between the amplifier 114 and the squaring circuit 54A is a current gain feedback system comprising a rectifier 118 which converts the AC signal to a DC signal and passes the DC signal onto a current gain amplifier 120. The current gain amplifier has an output connected to amplifiers 50A and 114. The current gain feedback system compensates for variations in the distance between the loop of wire of transmitter 44A encircling wagon 14 and the signal coils 48A and 108 as the discharge spout laterally swings relative to the wagon. In other words, the current feedback system keeps the amplitude of the signal constant due to the distance between the loop and the coils. Thus, the circuit of this invention relies solely upon variations in the angle $\theta$ for generation of a voltage to drive the discharge spout.

The operation of the second embodiment of this invention is similar to the first embodiment. The magnetic field generated by the loop of wire wrapped around the wagon induces a voltage in the signal coil 48A and the reference coil 108. These induced voltages are amplified and then compared in a phase detector to electronically discern any phase differential between the voltage induced in the signal coil 48A and the voltage induced in reference coil 110. After the phase differential has been electronically noted, the phase detector 52A generates a resulting voltage signal which is filtered and passed into actuator 56A which generates an output signal on one of two power amplifiers to drive an electrohydraulic valve in the proper direction to drive the spout into proper coordination with the outlet port of the wagon.

Thus, as the harvester is pulled through the field and negotiates a corner, the spout moves relative to the wagon and a voltage is induced in the reference and signal coils 48A and 110 proportional to the angle $\theta$. This voltage then is electronically operated on to actuate the electrohydraulic unit 38 which drives the spout back into coordination with the wagon. When the discharge spout and the wagon are properly coordinated, the angle $\theta$ between the signal coil and the magnetic flux vector is 90° and the signal voltage induced in the signal coil goes to zero, thereby causing actuator 56 to be turned off which stops any further driving movement of the discharge spout.

Thus, it is apparent that there has been provided, in accordance with the invention, a magnetic control circuit for controlling the lateral movement of a discharge spout on a forage harvester that fully satisfies the objects, aims, and advantages set forth above.

While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the appended claims.

I claim:

1. A control circuit for actuating the drive unit for swinging the discharge spout of a harvester in response to movement of a wagon trailing the harvester comprising:
   a. an excitation signal source for generating an excitation signal;
   b. transmitting means carried by the wagon for generating, upon energization by the excitation signal, a magnetic field;
   c. a magnetically responsive signal coil carried by the harvester and adapted for common movement with the discharge spout thereof; said coil having induced therein by said magnetic field a signal voltage which is a function of the angle between the axis of the coil and the magnetic flux vector at the coil;
   d. means for producing a reference voltage cognizant of the phase of the excitation signal;
   e. a phase detector for discerning the phase differential between the signal voltage and the reference voltage; said phase detector having an output signal;
   f. actuator means for actuating said drive unit in response to the output signal of the phase detector such that the spout is maintained in proper coordination with the wagon.

2. A control circuit as in claim 1 wherein said transmitting means includes at least one loop of wire wrapped around and carried by said wagon.

3. A control circuit as in claim 1 wherein the axis of the signal coil is so positioned on said discharge spout that the signal voltage induced therein by the magnetic field is a function of the trigometric cosine of the angle between the axis of the coil and said magnetic flux vector.

4. A control circuit as in claim 1 wherein said actuator includes dead band circuitry for stabilizing the actuation of the drive unit to prevent oscillatory movement of the discharge spout.

5. A control circuit as in claim 1 wherein said means for producing a reference voltage cognizant of the phase of the excitation signal comprises squaring circuitry having an input fed from the excitation signal source by an electrical conduit and having an output which feeds the phase detector.

6. A control unit as in claim 1 wherein said means for producing a reference voltage cognizant of the phase of the excitation signal comprises:
   a. a reference coil mounted on the discharge spout and adapted for common movement therewith, said coil having induced therein an output voltage proportional to the trigometric sine of the angle between the signal coil and said magnetic flux vector;
   b. squaring circuitry having an input for receiving the output voltage from said reference coil and a reference voltage which is fed to said phase detector.

7. A control circuit as in claim 6 further including an amplifier between the signal coil and the phase detector and a second amplifier between the reference coil and the squaring circuit.

8. A control circuit as in claim 7 further including a current gain feedback system electrically coupled to said first and second amplifiers for compensating for variations in distances between the transmitting means and the signal and reference coils.

9. A control circuit as in claim 8 wherein said current gain feedback system comprises:
   a. a rectifier having an input coupled to the output of said second amplifier and an output;
   b. a current amplifier having an input connected to the output of said rectifier and having an output which is fed to said first and second gain amplifiers wherein variations in the distance between the transmitting means and the reference and signal coils are compensated.

* * * * *